(12) United States Patent
Place et al.

(10) Patent No.: US 10,683,058 B2
(45) Date of Patent: Jun. 16, 2020

(54) BICYCLE DRIVE TRAIN

(71) Applicant: Traction Technologies, Inc., Pleasant Hill, CA (US)

(72) Inventors: John Place, Walnut Creek, CA (US); Robert Lobue, Daly City, CA (US)

(73) Assignee: Traction Technologies, Inc.

( * ) Notice: Subject to any disclaimer, the term of this patent is extended or adjusted under 35 U.S.C. 154(b) by 0 days.

(21) Appl. No.: 15/709,430

(22) Filed: Sep. 19, 2017

(65) Prior Publication Data
US 2019/0389537 A1    Dec. 26, 2019

Related U.S. Application Data

(60) Provisional application No. 62/397,470, filed on Sep. 21, 2016.

(51) Int. Cl.
*B62M 9/02* (2006.01)
*B62M 23/00* (2006.01)

(52) U.S. Cl.
CPC .............. *B62M 9/02* (2013.01); *B62M 23/00* (2013.01)

(58) Field of Classification Search
CPC ................................. B62M 9/02; B62M 23/00
See application file for complete search history.

(56) References Cited

U.S. PATENT DOCUMENTS

| | | | |
|---|---|---|---|
| 3,024,860 A * | 3/1962 | Nicolai ................ | B62K 15/006 180/224 |
| 3,193,305 A | 7/1965 | Hendricks | |
| 4,479,660 A * | 10/1984 | Pattison ................... | B62M 1/36 280/261 |
| 5,113,964 A * | 5/1992 | Yamauchi .............. | B62M 23/00 180/224 |
| 5,324,057 A * | 6/1994 | Chartrand .............. | B62M 23/00 280/230 |
| 5,397,142 A * | 3/1995 | Schwarzenbacher .... | B62M 1/12 280/259 |
| 6,068,279 A * | 5/2000 | Dion ...................... | B62M 23/00 280/230 |
| 6,095,540 A * | 8/2000 | Kim ....................... | B62M 23/00 280/259 |

(Continued)

FOREIGN PATENT DOCUMENTS

FR        915214 A     10/1946
JP     09104385 A  *   4/1997

(Continued)

*Primary Examiner* — Kevin Hurley
(74) *Attorney, Agent, or Firm* — Antero Tormey & Petrin; Pete Tormey (57) ABSTRACT

A multi-wheel bicycle with a dual universal joint disposed on a bicycle frame, wherein a first end of the universal joint is mounted to the bicycle frame and a second end of the universal joint is mounted on a moveable end of a bicycle steering fork. A front drive chain is couple from the universal joint to a front tire disposed on a free-wheeling front hub, and a second drive chain is coupled from the first end to a drive sprocket. The drive sprocket is further coupled to a free-wheeling hub attached to a front tire. The coupling provides for transfer of rotational power from the drive sprocket to the front and rear tires through the dual universal joint even as the universal is flexed through its range of motion while steering the bicycle.

2 Claims, 6 Drawing Sheets

(56) References Cited

U.S. PATENT DOCUMENTS

| | | | |
|---|---|---|---|
| 6,161,855 A | 12/2000 | Christini et al. | |
| 6,439,592 B1 * | 8/2002 | Christini | B62K 25/08 |
| | | | 180/223 |
| 6,446,985 B1 * | 9/2002 | Tompsett | B62M 23/00 |
| | | | 280/259 |
| 7,328,766 B2 * | 2/2008 | Christini | B62K 25/08 |
| | | | 180/224 |
| 7,775,314 B2 | 8/2010 | Blais | |
| 7,871,095 B2 * | 1/2011 | Killian | B62K 3/002 |
| | | | 280/259 |
| 8,226,103 B2 | 7/2012 | Reyes | |
| 9,067,642 B2 * | 6/2015 | Bovi | B62M 1/36 |
| 9,650,106 B1 * | 5/2017 | Singh | B62M 1/36 |
| 2006/0125205 A1 * | 6/2006 | Lai | B62K 3/005 |
| | | | 280/259 |
| 2010/0200322 A1 * | 8/2010 | Lawson | B62K 25/005 |
| | | | 180/224 |

FOREIGN PATENT DOCUMENTS

| | | | |
|---|---|---|---|
| JP | 2006021554 A * | 1/2006 | |
| WO | WO9527649 A1 | 10/1995 | |
| WO | WO2000056594 A1 | 9/2000 | |
| WO | WO2007034154 A1 | 3/2007 | |
| WO | WO-2016050041 A1 * | 4/2016 | B62M 9/02 |

* cited by examiner

BICYCLE DRIVE TRAIN

PRIORITY

This application claims the benefit of provisional patent application 62/397,470 filed Sep. 21, 2016 by the same inventors, which is included herein by reference as if fully set forth herein.

BACKGROUND

One disadvantage of bicycles is that the non-driven wheel, usually the front wheel, provides no power to propel the bicycle. In fact, when used for steering, the non-driven wheel adds drag to the cycling process. Since bicycling is human powered, any increase in efficiency will make the process easier on the user. Moreover, for certain activities such as off-road operation, providing power to all wheels may increase control of the bicycle. Accordingly, an economical and efficient means to provide power to both wheels of a bicycle would be beneficial.

SUMMARY

Disclosed herein is a multi-wheel bicycle with a dual universal joint disposed on a bicycle frame, wherein a first end of the universal joint is mounted to the bicycle frame and a second end of the universal joint is mounted on a moveable end of a bicycle steering fork. A front drive chain is coupled from the universal joint to a front tire disposed on a free-wheeling front hub, and a second drive chain is coupled from the first end to a drive sprocket. The drive sprocket is further coupled to a free-wheeling hub attached to a front tire. The coupling provides for transfer of rotational power from the drive sprocket to the front and rear tires through the dual universal joint even as the universal is flexed through its range of motion while steering the bicycle.

DESCRIPTION

Generality of Invention

This application should be read in the most general possible form. This includes, without limitation, the following:

References to specific techniques include alternative and more general techniques, especially when discussing aspects of the invention, or how the invention might be made or used.

References to "preferred" techniques generally mean that the inventor contemplates using those techniques, and thinks they are best for the intended application. This does not exclude other techniques for the invention, and does not mean that those techniques are necessarily essential or would be preferred in all circumstances.

References to contemplated causes and effects for some implementations do not preclude other causes or effects that might occur in other implementations.

References to reasons for using particular techniques do not preclude other reasons or techniques, even if completely contrary, where circumstances would indicate that the stated reasons or techniques are not as applicable.

Furthermore, the invention is in no way limited to the specifics of any particular embodiments and examples disclosed herein. Many other variations are possible which remain within the content, scope and spirit of the invention, and these variations would become clear to those skilled in the art after perusal of this application.

Lexicography

The term "Articulating" generally refers to the ability to bend or flex about an axis with relatively uninhibited actuation of the device that is articulating.

The terms "effect", "with the effect of" (and similar terms and phrases) generally indicate any consequence, whether assured, probable, or merely possible, of a stated arrangement, cause, method, or technique, without any implication that an effect or a connection between cause and effect are intentional or purposive.

The term "Freewheel" generally refers to a mechanism that locks when pedaling forward (forcing the wheel to be driven by the chain) and spins freely when coasting or pedaling backward.

The term "relatively" (and similar terms and phrases) generally indicates any relationship in which a comparison is possible, including without limitation "relatively less", "relatively more", and the like. In the context of the invention, where a measure or value is indicated to have a relationship "relatively", that relationship need not be precise, need not be well-defined, need not be by comparison with any particular or specific other measure or value. For example and without limitation, in cases in which a measure or value is "relatively increased" or "relatively more", that comparison need not be with respect to any known measure or value, but might be with respect to a measure or value held by that measurement or value at another place or time.

The term "substantially" (and similar terms and phrases) generally indicates any case or circumstance in which a determination, measure, value, or otherwise, is equal, equivalent, nearly equal, nearly equivalent, or approximately, what the measure or value is recited. The terms "substantially all" and "substantially none" (and similar terms and phrases) generally indicate any case or circumstance in which all but a relatively minor amount or number (for "substantially all") or none but a relatively minor amount or number (for "substantially none") have the stated property. The terms "substantial effect" (and similar terms and phrases) generally indicate any case or circumstance in which an effect might be detected or determined.

The terms "this application", "this description" (and similar terms and phrases) generally indicate any material shown or suggested by any portions of this application, individually or collectively, and include all reasonable conclusions that might be drawn by those skilled in the art when this application is reviewed, even if those conclusions would not have been readily apparent at the time this application is originally filed.

DETAILED DESCRIPTION

Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Profile View of Bicycle, Downtube Assembly

Figure 1:
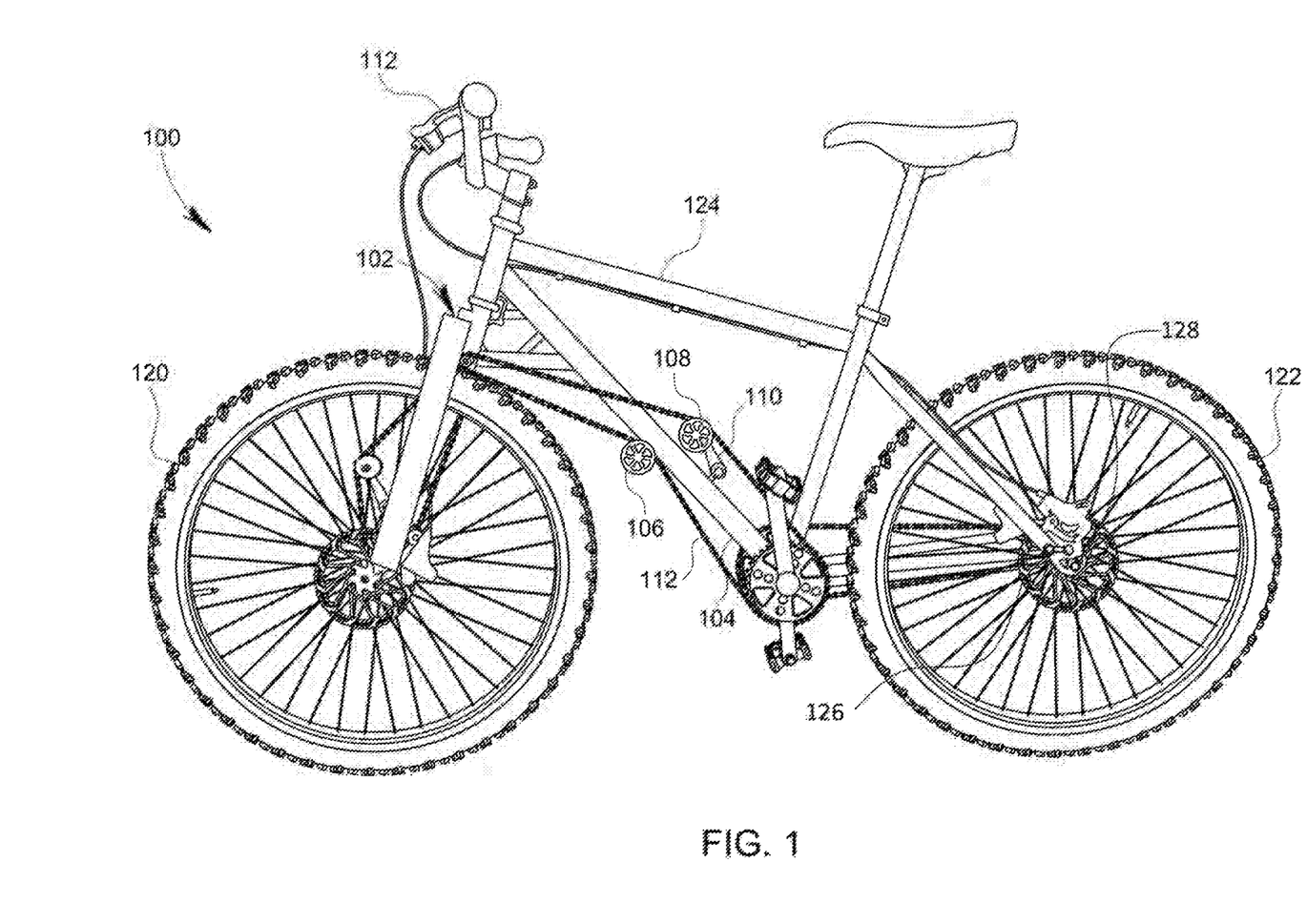
FIG. 1 illustrates a profile of a bicycle equipped with an articulating bicycle drive train disposed near the steering mechanism.

FIG. 1 illustrates a profile of a bicycle 100 equipped with an articulating bicycle drive train disposed near the steering mechanism 102. Articulating bicycle drive train 100 includes a downtube 104. Attached to the downtube 101 is a downtube input drive sprocket 106, downtube output drive sprocket 108, downtube chain tensioner 110, and downtube drive chain 112. The bicycle also includes a rear drive sprocket 126 coupled to a rear free-wheeling hub 128. In some embodiments, downtube drive chain 112 is supported or engages with downtube input drive sprocket 106, downtube output drive sprocket 108 and downtube chain tensioner 110. In further embodiments, downtube drive chain 112 is kept taut by downtube chain tensioner 110, which may compensate for slack in downtube drive chain 112. Bicycle 100 further includes a top tube 124, handlebars 112, front tire 120, and rear tire 122.

Oblique View of Bottom Bracket

Figure 2:
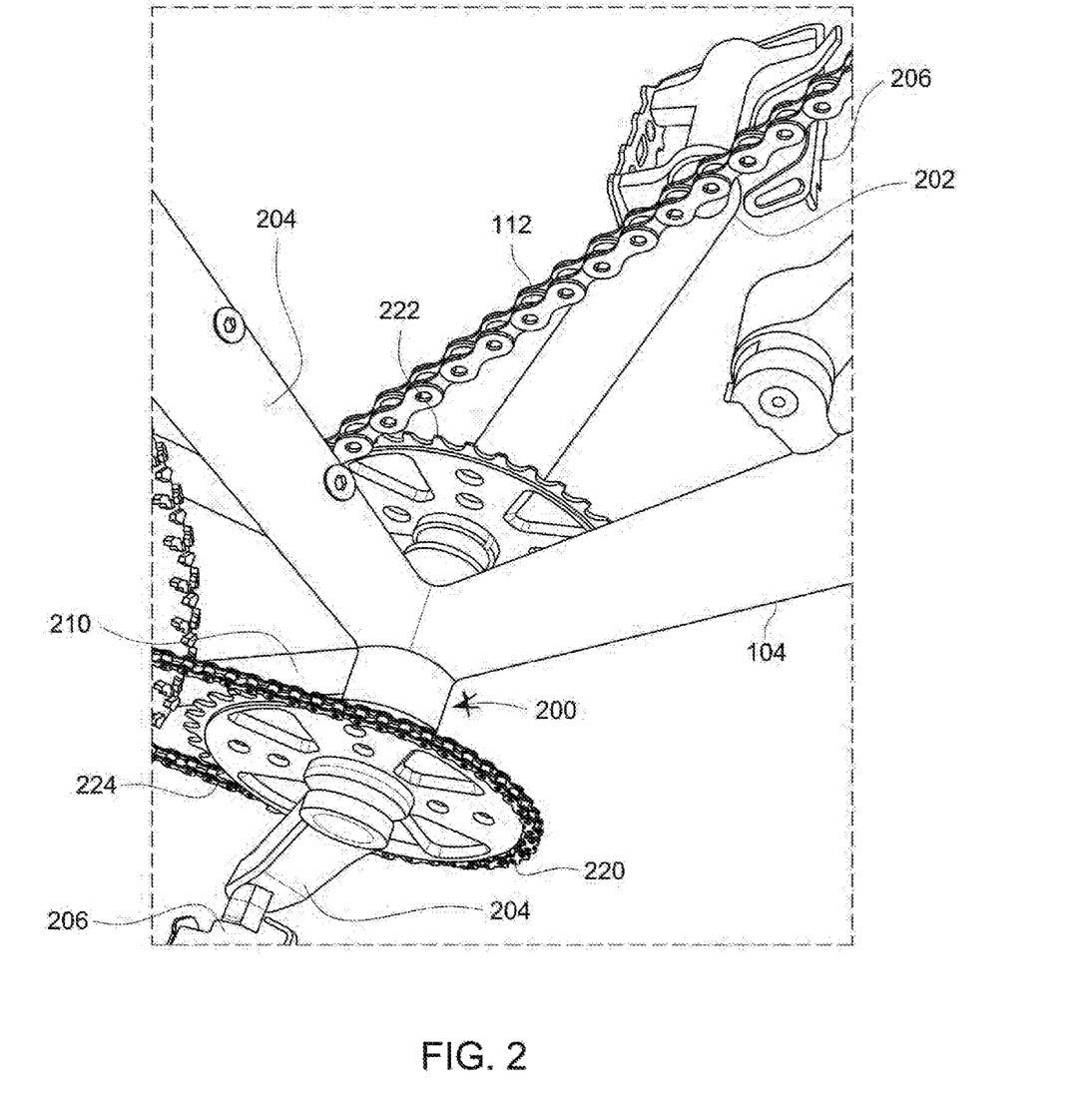
FIG. 2 illustrates a bottom bracket for an articulating bicycle drivetrain from an oblique angle, according to certain embodiments of this disclosure.

FIG. 2 illustrates a bottom bracket 200 for an articulating bicycle drivetrain from an oblique angle, according to certain embodiments of this disclosure. Bottom bracket 200 serves as a housing for a spindle (obscured) which is mated to a left crankshaft 202 and a right crank shaft 204, to which pedals 206 are mated. Bottom bracket 200 may serve as a structural nexus to which downtube 104, seat tube 204 and rear fork 210 meet and disperse from.

Further mated to the spindle are rear drive chainring 220 and front drive chainring 222. In one embodiment, rear drive chain 224 may be engaged with rear drive chainring 220 by enmeshing the individual teeth of rear drive chainring 220 in correspondingly-sized gaps in rear drive chain 224. Rear drive chain 224 may also be enmeshed with rear sprocket 230 (not pictured). In one embodiment, tension on rear drive chain 224 may be maintained using a derailleur (not pictured).

In another embodiment, downtube drive chain 112 may be engaged with front drive chainring 222 by enmeshing the individual teeth of front drive chainring 222 in correspondingly-sized gaps in downtube drive chain 112. In some embodiments, downtube drive chain 112 is tensioned by downtube chain tensioner 110.

In some operations, rear drive chainring 220 and front drive chainring 222 rotate at approximately a one-to-one ratio. In other embodiments, rear drive chainring 220 and front drive chainring 222 rotate at different ratios. In further embodiments, a pedaling action by the user causes both rear drive chainring 220 and front drive chainring 222 to rotate which may cause both front tire 120 and rear tire 122 to undergo torque, as further described herein. In this manner, locomotion of a user and bicycle 100 may be caused by both front tire 120 in addition to locomotion supplied by a rear tire 122.

Front Drivetrain Mechanism and Support

Figure 3:
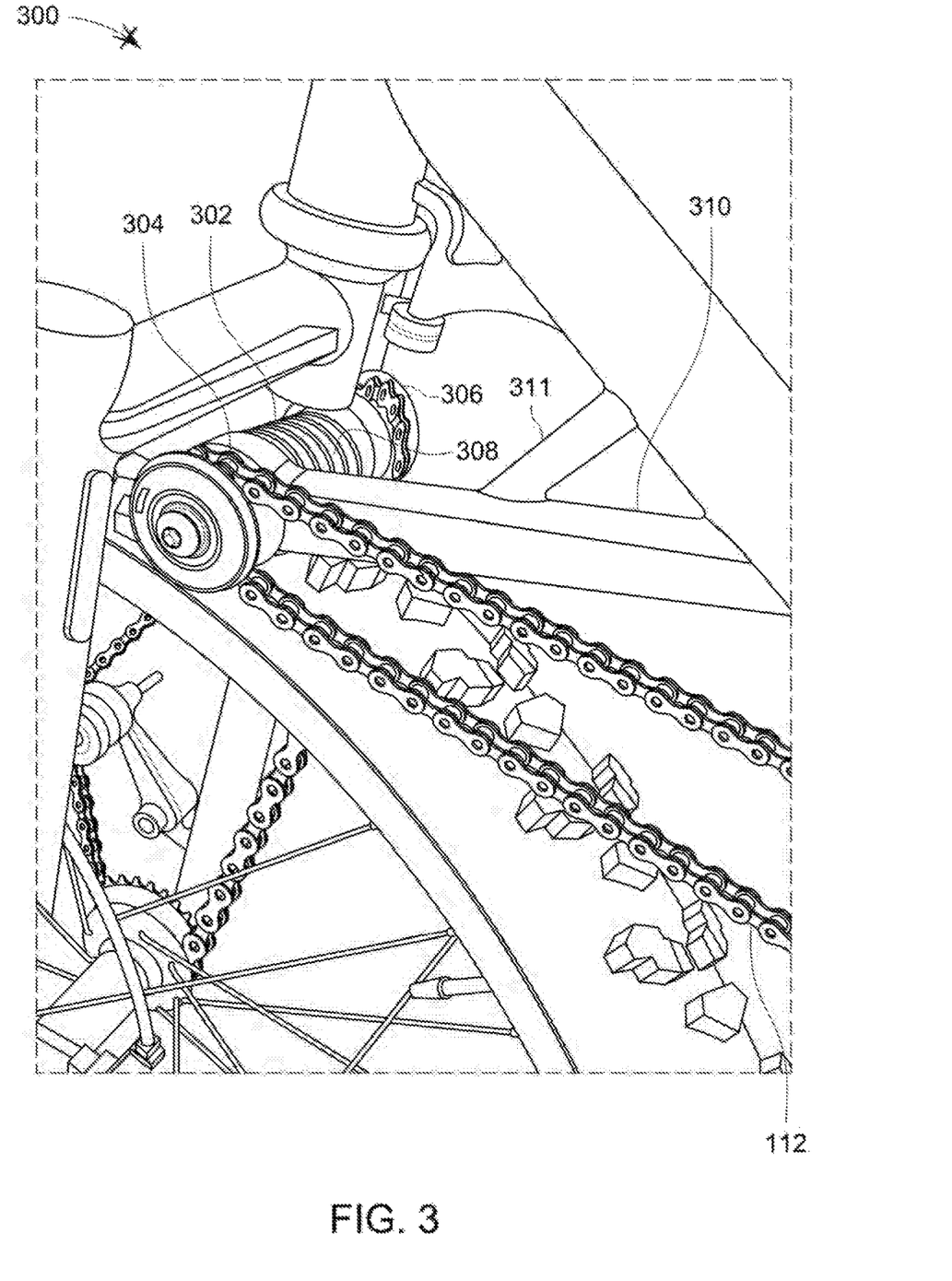
FIG. 3 illustrates one view of articulation mechanism which may be employed in some embodiments.

FIG. 3 illustrates one view of articulation mechanism 300 which may be employed in some embodiments. Articulation mechanism 300 includes downtube drive chain 112, double universal joint 302 (partially obscured), input sprocket 304, output sprocket 306, and optional dustcover 308. Articulation mechanism 300 may undergo various forces and torques including but not limited to: steering forces, drivetrain forces, tire resistance torque and ground impact forces. Articulation mechanism 300 is supported against one or more of these forces by support link 310, which may be welded to a frame directly and in some embodiments, by auxiliary support link 311.

Double universal joint 302 may be protected from debris by placement of a rubber accordion style boot such as optional dustcover 308, which may be slipped over a dual cross-pin U-joint connection and may flex through a range of motion, accordingly, to form the dual universal joint.

In one embodiment, downtube drive chain 112 may be engaged with input sprocket 304 by enmeshing the individual teeth of input sprocket 304 in correspondingly-sized gaps in downtube drive chain 112. Input sprocket 304 is mounted on one side of double universal joint 302. Input sprocket 304 rotates double universal joint 302 which drives output sprocket 306. Input sprocket 304 may be held on to double universal joint 302 using nuts and spacers for alignment of downtube drive chain 112.

Front Fork Drivetrain

Figure 4:
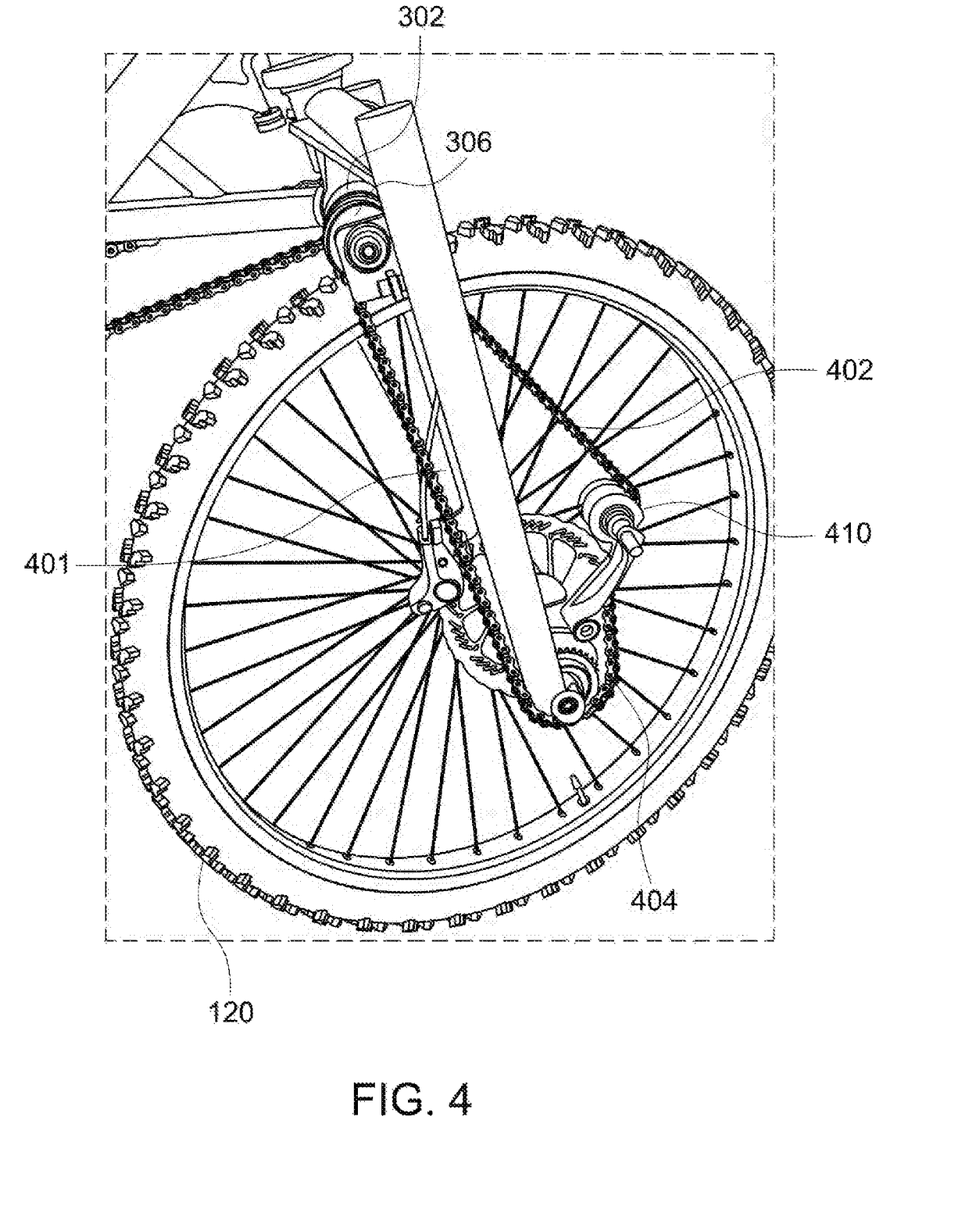
FIG. 4 illustrates one view of an aspect of the articulation mechanism employed in certain embodiments.

FIG. 4 illustrates one view of an aspect of the articulation mechanism 400 employed in certain embodiments, which may include front fork 401, front fork chain 402, front fork sprocket 404 and front tire 120 and optimally, front fork chain tensioner 410.

In one embodiment front fork chain 402 may be engaged with output sprocket 306 by enmeshing the individual teeth of output sprocket 306 in correspondingly-sized gaps in front fork chain 402. Output sprocket 306 may be held on to double universal joint 302 using nuts and spacers for alignment of front fork chain 402. In one embodiment, front fork chain 402 may be engaged with front fork sprocket 404 by enmeshing the individual teeth of front fork sprocket 404 in correspondingly-sized gaps in front fork chain 402. In one embodiment, front fork chain 402 is tensioned by front fork chain tensioner 410 which may compensate for slack in front fork chain 402. In some embodiments, output side of double universal joint 302 may be fitted with multiple keyways to hold output sprocket 306 from free spinning (e.g., partial or complete loss of drive).

In operation, drivetrain power is transferred from pedals 206 to front tire 120 as follows. From the pedal and associated mechanisms to downtube drive chain 112 to input sprocket 304 of the double universal joint 302. Rotational power from the double universal joint 302 is thereby coupled to output sprocket 306. Output sprocket 306 transfers drivetrain power from the input sprocket 304 via double universal joint 302 to front fork chain 402. In turn, front fork chain 402 transfers drivetrain power to front fork sprocket 404. Finally, front fork sprocket 404 provides drivetrain power front tire 120. This transfer of drivetrain power causes torque on front tire 120, thus supplying locomotion for a user of a bicycle to the front tire 120 alternatively to or in addition to a rear tire 122 or both simultaneously according to the mechanisms described herein.

In some embodiments, front fork 401 may be a shock-absorbing front fork (not pictured). In this manner, front fork chain tensioner 410 may act to tension front fork chain 402 such that when a shock-absorbing front fork absorbs shock and telescopes, front fork chain tensioner 410 may provide additional tension to front fork chain 402 if slack in front fork chain 402 occurs.

Decoupling Front and Rear Wheels

In some embodiments, front fork sprocket 404 may be coaxially coupled to a free wheel or free hub to allow for largely uninhibited rotation of front tire 120. This uninhibited rotation of front tire 120 may be useful in the case in which front tire 120 rotates at a different speed than rear tire 122 (e.g., during a turn). In this manner, the two tires 120 and 122 traverse different amounts of terrain such that the translational distance undergone by tires 120 and 122 incurs over different rotational distances, thus encouraging different tires 120 and 122 to undergo two distinct rotational velocities. By way of example and not limitation, when user turns a bicycle, one tire may rotate at a different speed than another tire, and use of a free wheel or free hub on one or both tires may allow for compensation of these different speeds.

In a further embodiment, front tire 120 and rear tire 122 may be fitted with the same type of free wheel or free hub. In another embodiment, front tire 120 and rear tire 122 may be fitted with free wheels or free hubs that include similar gearing at both wheels or hubs. In this manner, the free wheels or free hubs may counteract forces experienced when steering. In another embodiment, an internal gear hub (e.g., epicyclic gear system, not shown) may be used in combination with one or more of front tire 120 or rear tire 122 to allow a user of a bicycle to shift gears while still supplying drive to front tire 120 through front drivetrain 110. In yet another embodiment (not shown), a cassette of multiple sprockets and a derailleur may be used to select gears on front tire 120 and or rear tire 122 or both. Decoupling the front and rear ties may be effectuated at alternative places in the drive train, for example and without limitation by having free spinning gears in the double universal joint so that if the front wheel is spinning faster than the drive mechanism, the rotation of tires is decoupled.

Rotation and Articulation of Drivetrain Mechanism

Figure 5A:
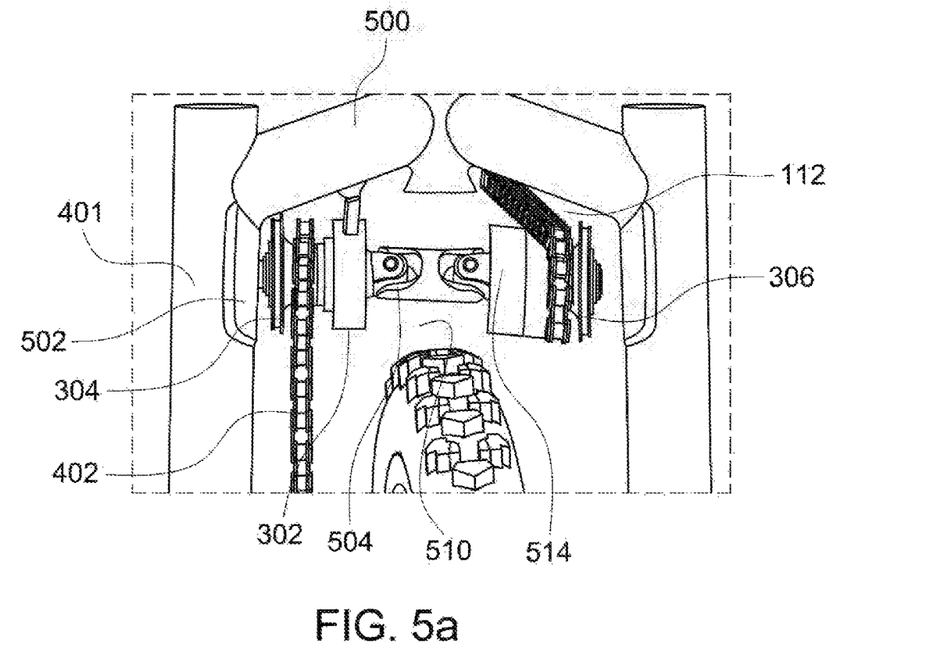
FIG. 5 illustrates an embodiment of an articulating drivetrain mechanism in two angles of pivot.
Figure 5B:
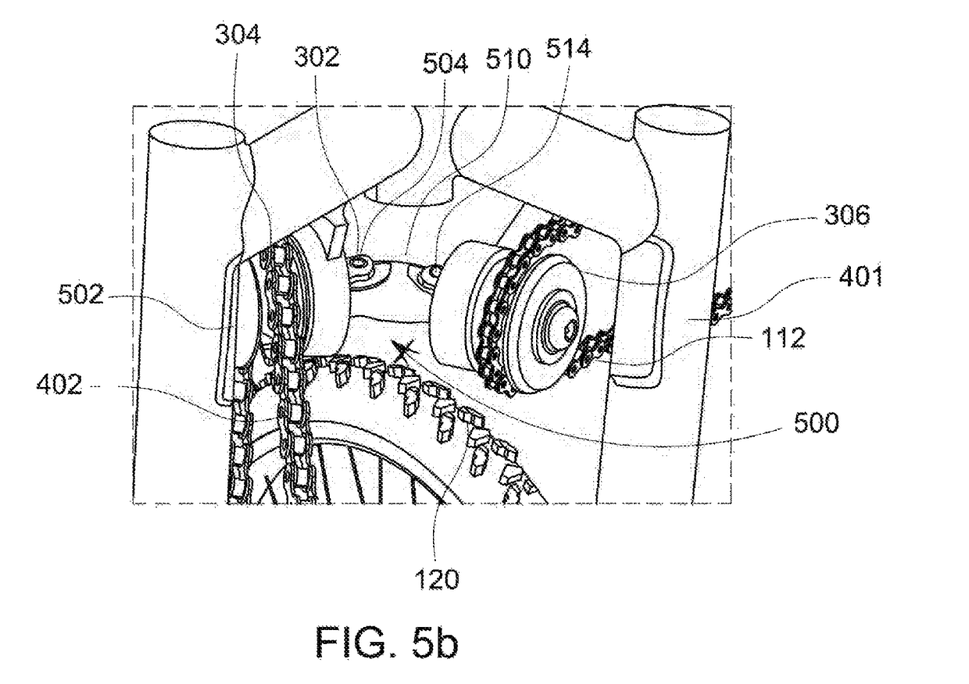

FIG. 5 illustrates an embodiment of an articulating drivetrain mechanism 500 in two angles of pivot FIG. 5A and FIG. 5B. Drivetrain mechanism 500 includes a double universal joint 302, input sprocket 304, input yoke 504, input cross journal bearing 508 (obscured), double yoke 510, output cross journal bearing 512 (obscured), output yoke 514, and output sprocket 306.

In one embodiment, the double universal joint 302 may rest on four separate, sealed roller bearings. A first pair of sealed roller bearings are located on the input side of double universal joint 302 and support the input side of double universal joint 302 to top tube 124. A second pair of sealed roller bearings located on the output side of double universal joint 302 support the output side of double universal joint 302 to front fork 401. In another embodiment, this configuration may be reversed: the input side of double universal joint 302 may be supported by front fork 401 and the output side of double universal joint 302 may be supported by top tube 124.

In yet another embodiment, articulating drivetrain mechanism 500 may be structured as follows: input sprocket 304 may be coaxially mounted to input yoke 504. Input yoke 504 ensconces two end pivots of input cross journal bearing 508. Double cardan yoke 510 ensconces two end pivots of input cross journal bearing 508, as well as two end pivots of output cross journal bearing 512. Output yoke 514 ensconces two end pivots of output cross journal bearing 512. Output yoke 514 is coaxially mounted to output sprocket 306. Output sprocket 306 is coupled to front fork chain 402. In one embodiment, double universal joint 302 may utilize sprockets of the same size or circumference as other sprockets described herein.

Double universal joint 302 may be fitted with multiple keyways to reduce free spinning (e.g., partial or complete loss of drive) on one side of yoke of the double universal joint 302. Input sprocket 304 may be held on to double universal joint 302 using nuts and spacers to facilitate proper drive chain alignment. In other embodiments, the double universal joint 302 may be formed to allow for free spinning to effectuate action similar to a free wheeled hub to decouple the front and rear wheels.

Articulation mechanism 500 may be further supported by a mounting one or more ends of double universal joint 302 to one or more tangs of front fork 401. As shown, double universal joint 302 is mounted to the right tang of front fork 401 by a hardpoint such as pinion 502 for support. In another embodiment, double universal joint 302 may be mounted to the left tang of front fork 401 through an additional pinion (not shown) mounted to right fork 401, or to both left and right tangs of front fork 401.

Articulation mechanism 300 may undergo various forces and torques including but not limited to: steering forces, drivetrain forces, tire resistance forces and ground impact forces. Articulation mechanism 300 may be supported against at least these forces by pinion 502, which may be welded to bicycle 100 directly and in one embodiment, by pinion 502.

Rotation of articulating drivetrain mechanism 500 in a first angle of pivot 530 is described as follows. In one embodiment, first angle of pivot 530 is relatively low, i.e., such that double universal joint 302 is relatively straight and unflexed. This may occur, by way of example and not limitation, when front tire 120 is approximately in line with rear tire 122, e.g., a user of bicycle 100 has not turned the handlebars 112. Drivetrain power is transferred from input sprocket 304 to input yoke 504 to input cross journal bearing 508 to double cardan yoke 510 to output cross journal bearing 512 to output yoke 514 to output sprocket 306, one or more of these elements may be relatively straight (e.g., not flexed, sharing the same axis). Finally, drivetrain power is supplied to front fork chain 402.

Rotation of articulating drivetrain mechanism 500 in a second angle of pivot 560 is described as follows. In one embodiment, articulating drivetrain mechanism may pivot on one or more axes due to the rotation of attached handlebars (not shown), thus second angle of pivot 560 may be more acute than first angle of pivot 530. By way of example and not limitation, a user may turn handlebars 112 of bicycle 100 to turn front tire 120, and articulating drivetrain mechanism 500 may articulate about one or more axes such that some or all drivetrain power may be transferred to front tire 120 attached to front fork 401. In a further embodiment, articulating drivetrain mechanism may be constructed in such a manner that one or more drivetrain chains continue to supply some or all drivetrain power to the front tire, and furthermore, the one or more drivetrain chains remain largely in place and engaged with sprockets described herein.

Drivetrain power is transferred from input sprocket 304 to input yoke 504 to input cross journal bearing 508 to double cardan yoke 510 to output cross journal bearing 512 to output yoke 514 to output sprocket 306, and one or more of these elements may be flexed upon an associated hinge (e.g., input cross journal bearing 508) to compensate for, by way of example and not limitation, a rotation of the handlebars 112. In this manner, drivetrain power is supplied along articulating drivetrain mechanism 500 to front tire 120 despite the circumstance that articulating drivetrain mechanism 500 is flexed (i.e., undergoing articulation). In other words, articulating drivetrain mechanism 500 may be rotated such that drivetrain power is supplied to front tire 120 despite the fact that articulating drivetrain mechanism 500 is being articulated to compensate for steering of handlebars 112.

With drivetrain power transferred to front tire 120 in this manner, front fork chain 402 and downtube drive chain 112 may remain engaged to output sprocket 306 and input sprocket 304, respectively, without front fork chain 402 and downtube drive chain 112 slipping or becoming disengaged due to the displacement forces exerted by actuation of articulating drivetrain mechanism. For example, a user may turn the handlebars to steer the bicycle without one or more chains described herein slipping off one or more sprockets described herein. In some embodiments, articulating drivetrain mechanism 500 may allow for a 60 degree or greater total turn angle.

Double Universal Joint Details

Figure 6A:
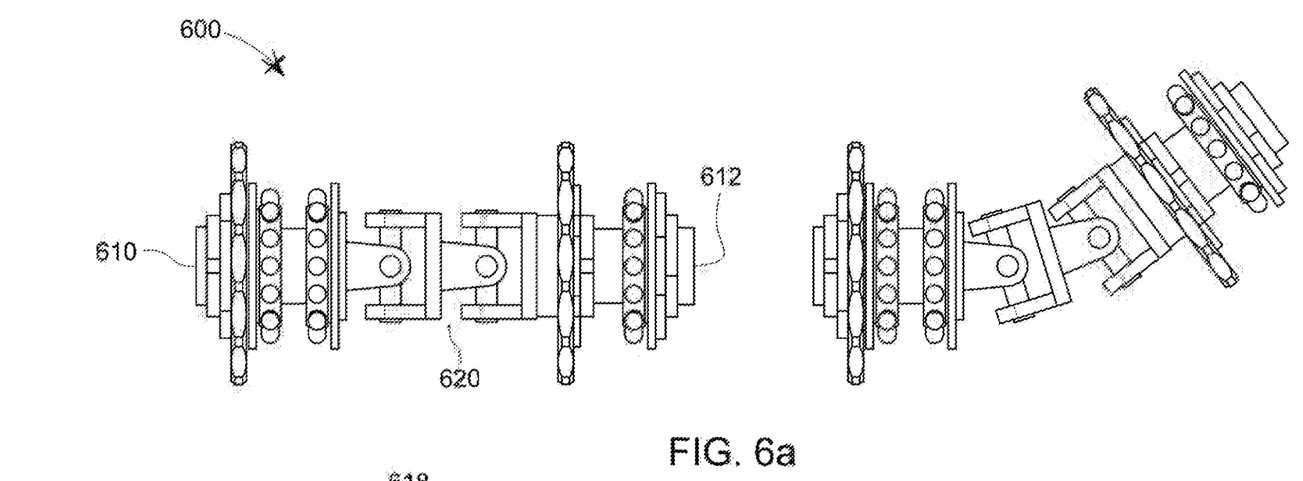
FIG. 6 shows details of one embodiment of a double universal joint using an exploded view
Figure 6B:
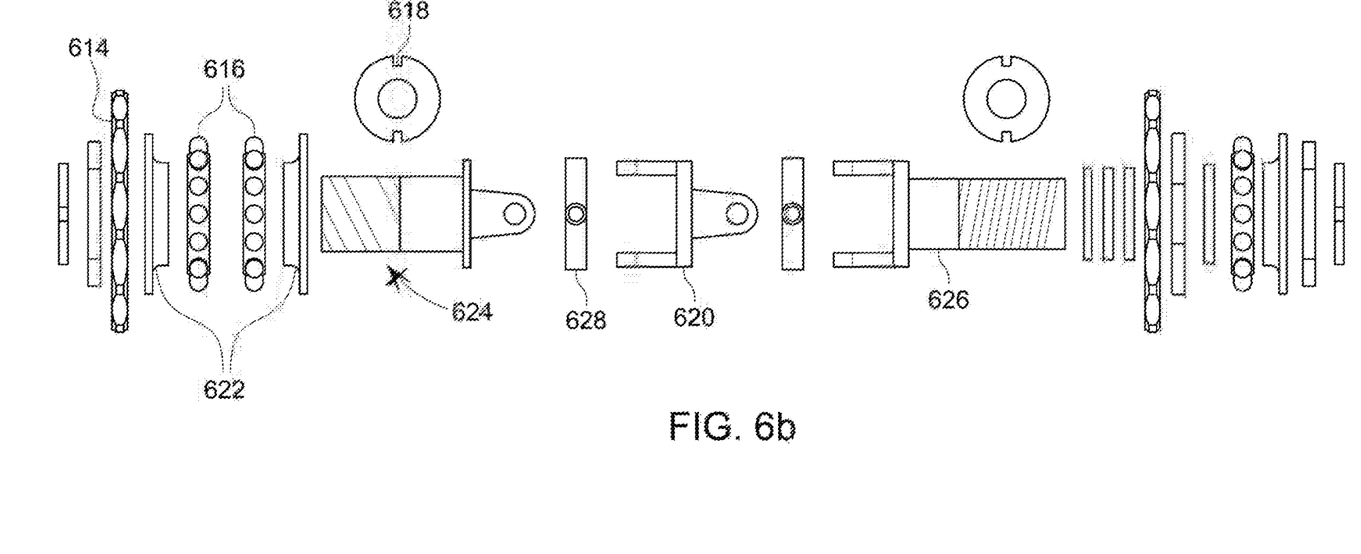

FIG. 6 shows details of one embodiment of a double universal joint 600 using an exploded view, and an operational view. In FIG. 6 a frame mounted shaft 610 includes a frame side sprocket 614 coupled to bearings 616 and bearing collars 622. The universal joint 600 includes a fork-mounted shaft 612 opposite the frame-mounted shaft 610. Disposed on frame-mounted yoke 624 is a double hooke's universal joint 620 held to the yoke 624 by pin 628. The yoke 624 includes a keyway, show as 618 to prevent it from rotating in certain embodiments. The universal joint 600 is substantially symmetrical having similar construction on the frame-mounted side and fork-mounted side as shown.

FIG. 6 shows the double universal joint 600 operationally wherein the bending action from the frame-mounted end 610 to the fork-mounted end 612 curves while still transmitting rotational power. With proper selection of parts, the curvature may exceed 60 degree allowing for the front wheel drive for to turn and still transmit power to the front wheel.

Changing Drive Gears

In certain embodiments drive gears may be changed to allow for different bicycle riding conditions. Conventionally derailleurs are used with a gear cassette to allow for changing a gear on a driven tire. As disclosed herein drive gear changing may be effectuated using two derailleurs, one front-mounted and one rear-mounted on their respective tires. In operation, a user may operate both derailleurs simultaneously using a single shifter. In preferred embodiments the front and rear wheel would be geared the same.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

We claim:

1. A multi-wheel bicycle including:
    a front drive chainring and a rear drive chainring coupled together through a bicycle frame;
    a dual hookes universal joint disposed on a bicycle frame, wherein a first end of the universal joint is fixed with respect to the bicycle frame with a support link extending from a downtube to a substantially central portion of the dual universal joint, and a second end of the universal disposed on a bicycle steering fork;
    an input sprocket, said input sprocket on the first end of the dual universal joint, said input sprocket coupled to the front drive chainring with a downtube drive chain;
    an output sprocket mounted on the second end of the universal joint, said output sprocket further coupled to a front fork chain which is further coupled to a front fork sprocket, said front fork sprocket operable to drive a front free-wheeling hub and;
    a rear drive chain disposed about the rear drive chainring, said rear drive chain couple to a rear chainring, said read chainring coupled to a rear hub;
    wherein power is applied to the front and rear hubs by operation of the front and rear drive chainrings.

2. The bicycle of claim 1 further including a chain tensioner disposed on the front fork and operable to apply pressure to the front drive chain.

* * * * *